(12) United States Patent
Ooi et al.

(10) Patent No.: US 9,403,704 B2
(45) Date of Patent: Aug. 2, 2016

(54) WATER TREATMENT METHOD AND WATER TREATMENT FLOCCULANT

(75) Inventors: Yasuhiro Ooi, Tokyo (JP); Keijirou Tada, Tokyo (JP); Yukio Abe, Takasaki (JP); Takeshi Iizuka, Takasaki (JP); Satoru Kitano, Takasaki (JP)

(73) Assignees: KURITA WATER INDUSTRIES, LTD., Tokyo (JP); GUN EI CHEICAL INDUSTRY CO., LTD., Takasaki-shi, Gunma (JP)

( * ) Notice: Subject to any disclaimer, the term of this patent is extended or adjusted under 35 U.S.C. 154(b) by 433 days.

(21) Appl. No.: 13/389,171

(22) PCT Filed: Aug. 5, 2010

(86) PCT No.: PCT/JP2010/063303
§ 371 (c)(1),
(2), (4) Date: Feb. 6, 2012

(87) PCT Pub. No.: WO2011/018978
PCT Pub. Date: Feb. 17, 2011

(65) Prior Publication Data
US 2012/0241377 A1    Sep. 27, 2012

(30) Foreign Application Priority Data

Aug. 11, 2009  (JP) .................................. 2009-186348
Mar. 31, 2010  (JP) .................................. 2010-081078

(51) Int. Cl.
*C02F 1/56* (2006.01)
*C08G 8/04* (2006.01)
(Continued)

(52) U.S. Cl.
CPC . *C02F 1/56* (2013.01); *C02F 1/441* (2013.01); *C08G 8/04* (2013.01); *C08L 61/06* (2013.01); *C02F 9/00* (2013.01)

(58) Field of Classification Search
None
See application file for complete search history.

(56) References Cited

U.S. PATENT DOCUMENTS 4,897,170 A    1/1990  Chandramouli
5,859,168 A *  1/1999  Kurimoto ................. C08G 8/04
                                                    528/129

(Continued)

FOREIGN PATENT DOCUMENTS

CN    101282913 A    10/2008
CN    101348295 A    1/2009

(Continued)

OTHER PUBLICATIONS

Negro et al. Flocculation mechanism induced by phenolic resin/PEO and floc properties.(2005). vol. 51, No. 3, pp. 1022-1031.*

(Continued)

*Primary Examiner* — Katherine Zalasky
*Assistant Examiner* — Kara Graber
(74) *Attorney, Agent, or Firm* — Manabu Kanesaka

(57) ABSTRACT

There is provided a water treatment method using a water treatment flocculant that suffers from minimal secondary contamination with flocculation residues and contains an alkaline solution of a phenolic resin. A water treatment method involving the addition of a flocculant to water to be treated and subsequent membrane separation treatment. The flocculant contains an alkaline solution of a phenolic resin having a melting point in the range of 130° C. to 220° C. The water treatment flocculant is produced by a resole-type second-order reaction in the presence of an alkaline catalyst in which an aldehyde is added to an alkali solution of a novolak phenolic resin. The novolak phenolic resin is produced by a reaction between a phenol and an aldehyde in the presence of an acid catalyst.

5 Claims, 1 Drawing Sheet

(51) Int. Cl.
*C02F 1/44* (2006.01)
*C08L 61/06* (2006.01)
*C02F 9/00* (2006.01)

(56) References Cited

U.S. PATENT DOCUMENTS

| | | | |
|---|---|---|---|
| 8,419,947 B2 | 4/2013 | Gaid | |
| 2003/0224165 A1 | 12/2003 | Anderson et al. | |
| 2008/0029459 A1 | 2/2008 | Yamasaki et al. | |
| 2009/0311543 A1 | 12/2009 | Abe et al. | |

FOREIGN PATENT DOCUMENTS

| | | | |
|---|---|---|---|
| JP | S51-759 | | 1/1976 |
| JP | S61-098717 | A | 5/1986 |
| JP | H02-024305 | A | 1/1990 |
| JP | H2-135257 | | 5/1990 |
| JP | H03-103417 | A | 4/1991 |
| JP | H3-146191 | | 6/1991 |
| JP | H6-262184 | | 9/1994 |
| JP | H06-262186 | A | 9/1994 |
| JP | H6-285476 | | 10/1994 |
| JP | H6-287262 | | 10/1994 |
| JP | H11-246643 | A | 9/1999 |
| JP | 2001-96279 | | 4/2001 |
| JP | 2003-292555 | A | 10/2003 |
| JP | 2004-113983 | | 4/2004 |
| JP | 2004-323822 | A | 11/2004 |
| JP | 2005-103361 | A | 4/2005 |
| JP | 2005-306987 | A | 11/2005 |
| JP | 2007-7563 | | 1/2007 |
| JP | 2008-173562 | A | 7/2008 |
| JP | 2010-17688 | | 1/2010 |
| JP | 2008173562 | * | 6/2011 ............ B01D 21/01 |

OTHER PUBLICATIONS

Machine translation of Yoshikazu et al. (JP2003292555), 10 pages.*
Machine translation of Yasushi et al. (JPH11246643), 2 pages.*
European Patent Office, "Extended European Search Report for EP 10 80 8161", Aug. 23, 2013.
China Patent Office, "Office Action for CN 201410007824.1," Nov. 15, 2014.

* cited by examiner

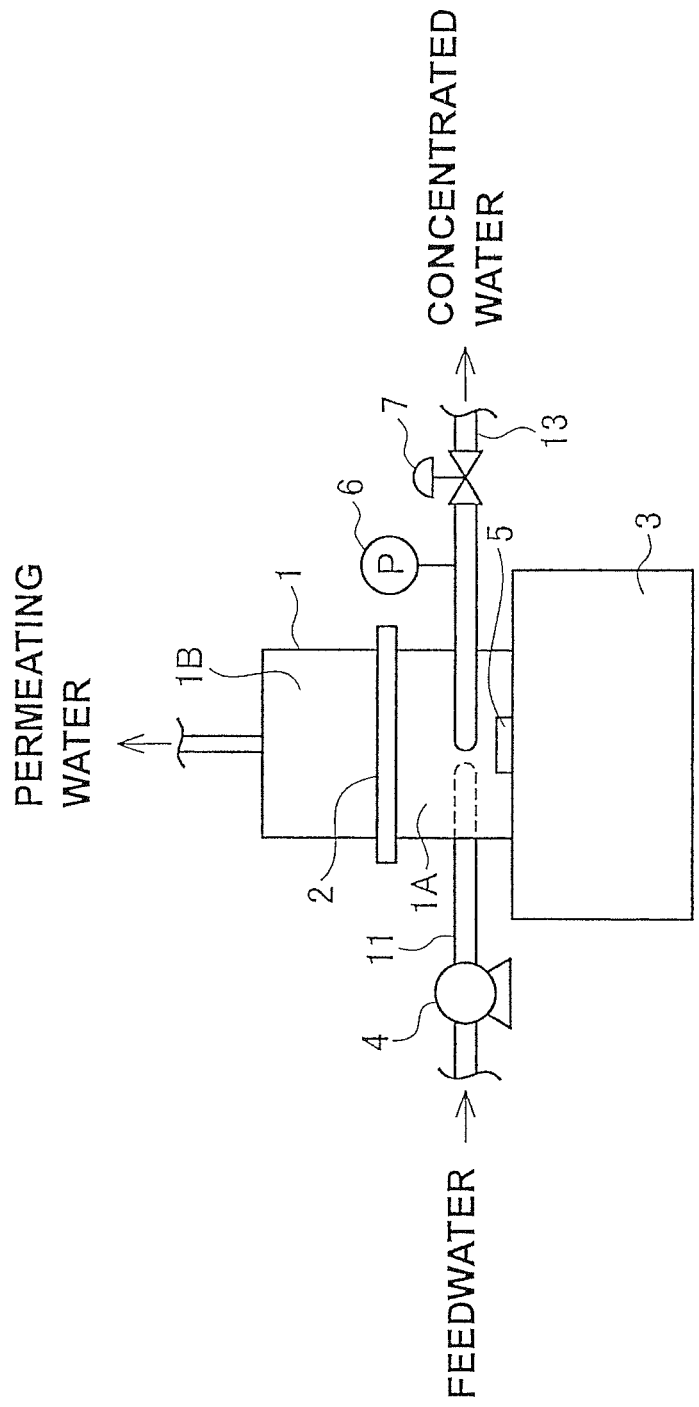

WATER TREATMENT METHOD AND WATER TREATMENT FLOCCULANT

FIELD OF INVENTION

The present invention relates to a water treatment flocculant containing an alkaline solution of a phenolic resin and a water treatment method involving the use of the water treatment flocculant. More particularly, the present invention relates to a water treatment flocculant that contains an alkaline solution of a phenolic resin, the phenolic resin having a melting point in the range of 130° C. to 220° C., which is much higher than the melting points of common novolak phenolic resins in the range of 50° C. to 100° C., and suffering from less secondary contamination with flocculation residues, and a water treatment method for treating water to be treated, to which the water treatment flocculant has been added, by membrane separation treatment, particularly a water treatment method effective for water treatment utilizing reverse osmosis (RO) membrane separation treatment.

The present invention also relates to a method for producing the water treatment flocculant.

BACKGROUND OF INVENTION

A novolak phenolic resin is called BAKELITE™ resin named after the inventor of this resin, was formerly used as plastic dishes and then as a fire-resistant, heat-resistant material of molds or the like that takes advantage of high heat resistance, insulating properties, and mechanical strength, and has recently been widely used as a raw material resin of electronic materials.

A novolak phenolic resin is produced by an addition condensation reaction between 1 mol of phenol and slightly less than 1 mol of formaldehyde in the presence of an acidic catalyst. In accordance with the reaction principle, a novolak phenolic resin has a two-dimensional linked structure via a methylene bond produced by an addition condensation reaction of formaldehyde with one phenol ring. The chains of the novolak phenolic resin therefore have a high degree of freedom. As a result, the novolak phenolic resin has a relatively low melting point generally in the range of 50° C. to 100° C. and 120° C. at the highest. Thus, it is easy to heat and soften the novolak phenolic resin in a forming process.

A novolak phenolic resin, which has no reactive methylol group, is mixed with a curing agent, such as hexamethylenetetramine, and appropriate auxiliary materials for the intended application, is softened by heating to at least the melting point of the resin, and is subjected to predetermined forming and a heat curing reaction to produce a resin product. The resin after the curing reaction has high heat resistance (resistance to deformation and thermal decomposition during heating), which supports various applications of BAKELITE™ resin.

Regarding a water treatment agent, an alkaline solution of a novolak phenolic resin is commercially available as an agent for the separation and recovery of paint present in circulating water for washing away paint residues in an automobile spray booth (Kurita Water Industries Ltd., trade name "Kuristuck B310").

However, this agent is a treatment agent of such a type that can be applied to spray booth circulating water. The agent cannot be used as a water treatment flocculant that can provide such a clarity that allows discharge to public waters, and there has been no actual example of using this agent as a water treatment flocculant.

This is because use of an alkaline solution of a novolak phenolic resin in the flocculation treatment of wastewater results in a large amount of components that are not flocculated and remain dissolved in water. The components remaining in the treated water increase the total organic carbon (TOC) of the treated water as compared with the water before the treatment, for example, as shown in Comparative Example 2 in Table 1 of Patent Document 1. This is accompanied by an increase in $COD_{Mn}$ (Chemical Oxygen Demand by Potassium Permanganate at 100° C.).

The components that are not flocculated and remain in the treated water have a molecular weight of 1000 or less and particularly contain a dinuclear phenol having a molecular weight of a little more than 200 in which two phenol skeletons are linked via a methylene bond.

In a thermosetting resin, which is an originally intended application of a novolak phenolic resin, and its curing process, the components react as components of curing resin and cause no particular problem.

While studying a technique for removing membrane contaminants introduced from raw water in membrane separation treatment with a reverse osmosis (RO) membrane or the like, the present inventors found that the alkaline solution of the novolak phenolic resin described above is effective in flocculating and removing membrane contaminants and improves MFF (Membrane Filter Factor), which is a measure of the membrane contamination level of treated water.

Similarly to FI (Fouling Index) defined in JIS K 3802 and SDI (Silt Density Index) defined in ASTM D4189, MFF has been proposed as a measure of the clarity of RO membrane feedwater and is usually measured with a microfiltration membrane having a pore size of 0.45 μm. More specifically, 50 mL of filtered water is filtered through a Millipore nitrocellulose membrane filter having a pore size of 0.45 μM and 47φ at a reduced pressure of 66 kPa (500 mmHg), and the filtration time T1 is measured. Another 500 mL is filtered under vacuum in the same manner, and the filtration time T2 is measured. MFF is calculated as the ratio of T2/T1. Pure water free of contaminants has T1=T2 and MFF of 1.00. MFF required for RO membrane supply is less than 1.10. Satisfactory MFF is said to be less than 1.05.

However, in order to achieve a favorable MFF of less than 1.1, the amount of alkaline solution of a novolak phenolic resin to be added must be increased, and the percentage of flocculation residues is high. This markedly increases residual resin components in treated water. In an actual flat membrane test using an RO membrane, the residual resin components become additional membrane contaminants that decrease permeation flux. Thus, the alkaline solution of a novolak phenolic resin is inappropriate to prevent a decrease in permeation flux.

As a method for removing a component that is not flocculated, Patent Documents 2 and 3 propose a method for neutralizing an alkaline solution of a novolak phenolic resin with an acid, performing solid-liquid separation of a precipitate and impurities that remain in water, and redissolving the precipitate in an alkaline for purification.

However, when the method described in Patent Documents 2 or 3 is applied with an alkaline solution containing approximately 30% novolak phenolic resin, the precipitate accounts for the total capacity. Thus, even centrifugation yields a very small amount of separate liquid. Furthermore, most of low-molecular-weight components that are not flocculated are transferred to the precipitate by adsorption and are associated with water. Thus, the amount of components eliminated is very small.

In order to achieve MFF of less than 1.1 with a small amount of alkaline solution of a novolak phenolic resin, decrease flocculation residues, and produce a purified product that can ensure a stable permeation flux in a flat membrane test using an RO membrane, the novolak phenolic resin concentration must be less than 0.5% (200-times or more diluted solution).

Thus, staring from a 200-times or more diluted solution of a novolak phenolic resin, commercialization of such a purification method requires large-capacity facilities for separation, dehydration, and drying of a purified product. At the same time, a waste fluid having a high $COD_{Mn}$ of 1000 mg/L or more is produced and must be treated. Furthermore, the precipitate tends to become a rubber-like mass and sticks to any portion of facilities. Thus, the commercialization of such a purification method is economically and technically difficult.

LIST OF DOCUMENTS

Patent Document

Patent Document 1: Japanese Patent Publication 3-146191
Patent Document 2: Japanese Patent Publication 6-285476
Patent Document 3: Japanese Patent Publication 6-287262

OBJECT AND SUMMARY OF INVENTION

Object of Invention

As described above, a novolak phenolic resin contains low-molecular-weight components that are not involved in flocculation and remain in treated water. Thus, an alkaline solution of the novolak phenolic resin cannot be used in the flocculation treatment of water and wastewater, in particular, as an upstream process of RO membrane separation treatment in which the residue of the alkaline solution becomes another membrane contaminant.

It is an object of the present invention to provide a water treatment flocculant at low cost and high yield that suffers from less secondary contamination with flocculation residues and contains an alkaline solution of a phenolic resin.

It is another object of the present invention to provide a water treatment method involving the use of such a water treatment flocculant and a method for manufacturing the water treatment flocculant.

SUMMARY OF INVENTION

The present inventors tried a resole-type second-order reaction in which an aldehyde is added to a novolak phenolic resin dissolved in an alkaline solution to perform an addition condensation reaction. This can provide an alkaline solution of a phenolic resin at low cost and high yield. The alkaline solution of a phenolic resin can reduce the amount of low-molecular-weight components, including a dinuclear phenol, that remain in a resin after flocculation treatment, can increase the amount of high-molecular-weight components that contribute to improved flocculation effects, causes no problem with a product, such as the solidification of a resin component, and has a large effect of improving the membrane contamination indicator MFF.

Consequently, the proportion of formaldehyde for a resole-type second-order reaction, the reaction temperature, the reaction time, and other factors are studied to produce an alkaline solution of a second-order reaction resin having a nonconventional high melting point in the range of 130° C. to 220° C., preferably 150° C. to 200° C., and it was found that the alkaline solution can achieve the objective.

The present invention has been achieved on the basis of such findings and is summarized as follows.

A first aspect provides a water treatment method that involves a flocculation treatment process of adding a flocculant to water to be treated; and a membrane separation treatment process of treating flocculation-treated water of the flocculation treatment process by membrane separation, wherein the flocculant contains an alkaline solution of a phenolic resin having a melting point in the range of 130° C. to 220° C.

A second aspect provides a water treatment method that involves a flocculation treatment process of adding a flocculant to water to be treated; and a membrane separation treatment process of treating flocculation-treated water of the flocculation treatment process by membrane separation, wherein the flocculant contains an alkaline solution of a phenolic resin produced by a resole-type second-order reaction in the presence of an alkaline catalyst in which an aldehyde is added to an alkaline solution of a novolak phenolic resin, the novolak phenolic resin being produced by a reaction between a phenol and an aldehyde in the presence of an acid catalyst.

A third aspect provides the water treatment method according to the second aspect, wherein the phenolic resin produced by the resole-type second-order reaction has a melting point in the range of 130° C. to 220° C.

A fourth aspect provides the water treatment method according to any one of the first to third aspects, wherein the membrane separation treatment process is a reverse osmosis membrane separation treatment process.

A fifth aspect provides the water treatment method according to any one of the second to fourth aspects, wherein the novolak phenolic resin produced by the reaction between the phenol and the aldehyde in the presence of the acid catalyst contains 3% by weight or more of a dinuclear phenol and has a weight-average molecular weight of 2000 or more, and the phenolic resin produced by the resole-type second-order reaction contains less than 3% by weight of a dinuclear phenol.

A sixth aspect provides the water treatment method according to the fifth aspect, wherein the phenolic resin produced by the resole-type second-order reaction contains 10% by weight or less of a low-molecular-weight component having a molecular weight of 624 or less.

A seventh aspect provides the water treatment method according to the fifth or sixth aspect, wherein the phenolic resin produced by the resole-type second-order reaction contains 10% by weight or less of a low-molecular-weight component having a molecular weight of more than 624 and 1200 or less.

A eighth aspect provides the water treatment method according to any one of the first aspect and the third to seventh aspects, wherein the phenolic resin having a melting point in the range of 130° C. to 220° C. has a polystyrene equivalent weight average molecular weight in the range of 5000 to 50000.

A ninth aspect provides the water treatment method according to the eighth aspect, wherein the phenolic resin having a melting point in the range of 130° C. to 220° C. contains 15% by weight or less of a low-molecular-weight component having a molecular weight of 1000 or less.

A tenth aspect provides the water treatment method according to any one of the first to ninth aspects, wherein the flocculation treatment process involves addition of the flocculant to water to be treated and subsequent addition of an inorganic flocculant.

The eleventh aspect provides a water treatment flocculant that contains an alkaline solution of a phenolic resin having a melting point in the range of 130° C. to 220° C.

The twelfth aspect provides a water treatment flocculant that contains an alkaline solution of a phenolic resin produced by a resole-type second-order reaction in the presence of an alkaline catalyst in which an aldehyde is added to an alkaline solution of a novolak phenolic resin, the novolak phenolic resin being produced by a reaction between a phenol and an aldehyde in the presence of an acid catalyst.

The thirteenth aspect provides the water treatment flocculant according to the twelfth aspect, wherein the phenolic resin produced by the resole-type second-order reaction has a melting point in the range of 130° C. to 220° C.

A fourteenth aspect provides the water treatment flocculant according to the twelfth or thirteenth aspect, wherein the novolak phenolic resin produced by the reaction between the phenol and the aldehyde in the presence of the acid catalyst contains 3% by weight or more of a dinuclear phenol and has a weight-average molecular weight of 2000 or more, and the phenolic resin produced by the resole-type second-order reaction contains less than 3% by weight of the dinuclear phenol.

A fifteenth aspect provides the water treatment flocculant according to the fourteenth aspect, wherein the phenolic resin produced by the resole-type second-order reaction contains 10% by weight or less of a low-molecular-weight component having a molecular weight of 624 or less.

A sixteenth aspect provides the water treatment flocculant according to the fourteenth or fifteenth aspect, wherein the phenolic resin produced by the resole-type second-order reaction contains 10% by weight or less of a low-molecular-weight component having a molecular weight of more than 624 and 1200 or less.

A seventeenth aspect provides the water treatment flocculant according to any one of the eleventh aspect and the thirteenth to sixteenth aspects, wherein the phenolic resin having a melting point in the range of 130° C. to 220° C. has a weight-average molecular weight in the range of 5000 to 50000.

A eighteenth aspect provides the water treatment flocculant according to the seventeenth aspect, wherein the phenolic resin having a melting point in the range of 130° C. to 220° C. contains 15% by weight or less of a low-molecular-weight component having a molecular weight of 1000 or less.

A nineteenth aspect provides a method for producing a water treatment flocculant that involves reacting a phenol with an aldehyde in the presence of an acid catalyst to produce a novolak phenolic resin; and adding an aldehyde to an alkaline solution of the novolak phenolic resin to perform a resole-type second-order reaction in the presence of an alkaline catalyst.

A twentieth aspect provides the method for producing a water treatment flocculant according to the nineteenth aspect, wherein the phenol is reacted with the aldehyde in the presence of the acid catalyst to produce a novolak phenolic resin that has a dinuclear phenol content of 3% by weight or more and a weight-average molecular weight of 2000 or more, and the resole-type second-order reaction is performed to produce a phenolic resin having a dinuclear phenol content of less than 3% by weight.

A twenty-first aspect provides the method for producing a water treatment flocculant according to the twentieth aspect, wherein the resole-type second-order reaction is performed to produce a phenolic resin that contains 10% by weight or less of a low-molecular-weight component having a molecular weight of 624 or less.

A twenty-second aspect provides the method for producing a water treatment flocculant according to the twentieth or twenty-first aspect, wherein the resole-type second-order reaction is performed to produce a phenolic resin that contains 10% by weight or less of a low-molecular-weight component having a molecular weight of more than 624 and 1200 or less.

Advantageous Effects of Invention

A water treatment flocculant according to the present invention that contains an alkaline solution of a phenolic resin having a nonconventional high melting point in the range of 130° C. to 220° C. or an alkaline solution of a phenolic resin produced by a resole-type second-order reaction of a novolak phenolic resin can efficiently flocculate and remove contaminants that cannot be treated only with an inorganic flocculant generally used in flocculation treatment of water, such as a nonionic surfactant or an uncharged neutral polysaccharide. The water treatment flocculant can also reduce the contamination of treated water with contaminant components.

In particular, a water treatment flocculant according to the present invention is effective for flocculation treatment as a pretreatment process before a membrane separation treatment process, such as RO membrane separation treatment, improves the membrane contamination indicator MFF of water to be subjected to membrane separation treatment, and prevents a decrease in permeation flux of a membrane, such as an RO membrane, allowing stable and efficient membrane separation treatment for a long period of time.

Thus, a water treatment method according to the present invention that involves membrane separation treatment of flocculation-treated water treated with such a water treatment flocculant according to the present invention allows stable and efficient treatment continuously for a long period of time.

Furthermore, a method for producing a water treatment flocculant according to the present invention, in which an aldehyde is added to an alkaline solution of a novolak phenolic resin to perform a resole-type second-order reaction in the presence of an alkaline catalyst, can increase the molecular weights of low-molecular-weight components having a molecular weight of 1000 or less, including a dinuclear phenol, to decrease the percentage of the low-molecular-weight components, which are troublesome when used as a water treatment flocculant, convert the low-molecular-weight components into effective components for flocculation treatment, and increase the molecular weight and the melting point of the phenolic resin. Thus, the method for producing a water treatment flocculant can efficiently produce such a water treatment flocculant according to the present invention.

This method does not produce waste liquid, such as an organic solvent, and can achieve a yield of 100%. Thus, a phenolic resin water treatment flocculant containing a markedly decreased amount of low-molecular-weight components and having a high melting point and a high molecular weight can be produced at low cost and high yield.

BRIEF DESCRIPTION OF DRAWING

FIG. 1 is a schematic view of a flat membrane test apparatus used in examples.

DESCRIPTION OF EMBODIMENTS

Embodiments of the present invention will be described in detail below.

In the present invention, the molecular weight or the weight-average molecular weight is measured by a gel permeation chromatography (GPC) method and is calculated using a calibration curve prepared with standard polystyrenes.

[Water Treatment Flocculant]

First, a water treatment flocculant according to the present invention is described with reference to a method for manufacturing the water treatment flocculant.

A water treatment flocculant according to the present invention contains an alkaline solution of a phenolic resin that has a melting point in the range of 130° C. to 220° C.

Such a water treatment flocculant according to the present invention may be produced by any method. Preferably, a water treatment flocculant according to the present invention is produced by a method for producing a water treatment flocculant according to the present invention that involves reacting a phenol with an aldehyde in the presence of an acid catalyst to produce a novolak phenolic resin, and adding an aldehyde to an alkaline solution of the novolak phenolic resin to perform a resole-type second-order reaction in the presence of an alkaline catalyst.

More specifically, 0.2 to 0.4 mol of a formaldehyde per mol of phenol ring is added to an alkaline solution of a novolak phenolic resin and is allowed to react at a temperature in the range of 80° C. to 100° C. for 1 to 12 hours. The formaldehyde bonds to a phenol ring of low-molecular-weight components, including a dinuclear phenol, to form a reactive methylol group. The methylol group reacts with an existing phenolic condensation product to convert the low-molecular-weight components into high-molecular-weight active components for flocculation.

Simultaneously, the addition of the formaldehyde, the formation of a methylol group, and the addition reaction with another condensed polymer component also occur in a phenol ring of an existing condensed polymer component. This increases the average molecular weight of the entire resin by several times from between 2000 and 6000 to between 5000 and 30000.

This reaction converts the phenol ring from a two-dimensional structure (linear) having two linkages to a three-dimensional structure having three linkages, thereby decreasing the degree of freedom of the polymer chains and increasing the melting point of the phenolic resin.

A small increase in melting point results in an insufficient decrease in the amount of low-molecular-weight components. On the other hand, an excessive increase in melting point or even a measurement of no melting point (at 230° C. or more, the onset of decomposition makes the presence of a melting point unclear) results in a molecular weight of the phenolic resin in the order of one million or more and, in an extreme case, a state that the entire mass is linked to one molecule, and the resin cannot be dissolved and is precipitated and solidified. Even if the resin is still liquid, the resin has an increased viscosity and begins to be solidified after several days or several tens of days and cannot be practically used as a water treatment agent.

Thus, a phenolic resin having a melting point in the range of 130° C. to 220° C., preferably 150° C. to 200° C., as determined by a method described below can be applied as a water treatment flocculant.

In a method for producing a water treatment flocculant according to the present invention, the novolak phenolic resin that serves as a raw material in the resole-type second-order reaction is produced in accordance with a routine procedure by a polycondensation reaction between a phenol and an aldehyde in a reactor in the presence of an acidic catalyst and subsequent dehydration and removal of unreacted phenol at normal pressure and under reduced pressure.

Examples of the phenol for use in the production of the novolak phenolic resin include, but are not limited to, phenol, alkylphenol such as o-, m-, and p-cresols, o-, m-, and p-ethylphenols, and xylenol isomers, polyaromatic ring phenol such as α- and β-naphthols, polyvalent phenol such as bisphenol A, bisphenol F, bisphenol S, pyrogallol, resorcin, and catechol, and hydroquinone. These phenols may be used alone or in combination.

Among these, phenol, cresols, xylenols, and catechol are preferable practically.

Examples of the aldehyde include, but are not limited to, formaldehyde, paraformaldehyde, acetaldehyde, propylaldehyde, benzaldehyde, salicylaldehyde, and glyoxal. The aldehydes may be used alone or in combination.

Among these, practical substances include formaldehyde and paraformaldehyde.

Examples of the acid catalyst for use in the production of the novolak phenolic resin include, but are not limited to, inorganic acids, such as hydrochloric acid, sulfuric acid, and phosphoric acid, organic acids, such as oxalic acid, acetic acid, citric acid, tartaric acid, benzoic acid, and p-toluenesulfonic acid, and organic acid salts, such as zinc acetate and zinc borate. These acid catalysts may be used alone or in combination.

The novolak phenolic resin serving as a raw material in the resole-type second-order reaction may have any melting point. A novolak phenolic resin having a high melting point of 65° C. or more is advantageous because it contains a decreased amount of low-molecular-weight components, which are targets for the resole-type second-order reaction, and has a wider condition range for the resole-type second-order reaction that can provide a target melting point of the resin after the second-order reaction in the range of 130° C. to 220° C.

A novolak phenolic resin having a fixed composition and a higher melting point results in a higher molecular weight of the raw material novolak phenolic resin, a higher molecular weight of the resin after the resole-type second-order reaction, and an improved flocculation effect as a flocculant.

Although the raw material novolak phenolic resin has no particular upper limit of the melting point, novolak phenolic resins are generally used by being melted and softened by heating, formed, and heat cured, and therefore novolak phenolic resins having a melting point of 120° C. or more are rarely industrially produced.

When the melting point is more than 120° C., the softening and flow temperature is approximately 150° C. or more, and the local temperature of the novolak phenolic resin in a reactor is much higher than 200° C. Thus, the resin may be decomposed or burnt and stick on the reactor and cannot have stable quality. Furthermore, because of an excessively high melt viscosity, it is industrially difficult to remove the resin.

The novolak phenolic resin serving as a raw material in the resole-type second-order reaction may have any molecular weight. A resin having a higher molecular weight is preferred not only because the resin is not involved in the flocculation of a dinuclear phenol and a component having a molecular weight of approximately 624 or less after the completion of the second-order reaction but also because this results in a decreased amount of low-molecular-weight components that remain in flocculation-treated water and contaminate the treated water. Thus, the novolak phenolic resin to be used preferably has a weight-average molecular weight of 1000 or more, particularly preferably 2000 or more.

Although the novolak phenolic resin has no particular upper limit of the molecular weight, the upper limit of the weight-average molecular weight is approximately 6000 under application and production constraints.

Such a novolak phenolic resin even having a weight-average molecular weight of approximately 2000 or more contains 3% by weight or more of a dinuclear phenol having a molecular weight of approximately 200 and a total of 15% by weight or more of low-molecular-weight components having a molecular weight of 624 or less that are not involved in flocculation and are likely to remain in flocculation-treated water. For example, a novolak phenolic resin produced using phenol and formaldehyde as raw materials generally contains approximately 3% to 20% by weight of a dinuclear phenol having a molecular weight of approximately 200, a total of approximately 15% to 40% by weight of low-molecular-weight components having a molecular weight of 624 or less that are not involved in flocculation and are likely to remain in flocculation-treated water, and a total of approximately 25% to 50% by weight of low-molecular-weight components having a molecular weight of 1000 or less that do not have a flocculation effect.

In the present invention, an alkaline solution of such a novolak phenolic resin is first prepared.

Examples of a solvent in which the novolak phenolic resin is dissolved include aqueous solutions containing one or two or more alkali metal or alkaline-earth metal hydroxides, such as sodium hydroxide, potassium hydroxide, calcium hydroxide, and barium hydroxide. This solvent also serves as an alkaline catalyst in the subsequent resole-type second-order reaction.

The alkaline solution also serving as the alkaline catalyst in the resole-type second-order reaction may also be a basic solvent in which an organic base, such as triethylamine, trimethylamine, 1,8-diazabicyclo[5.4.0]undec-7-ene (DBU), or 1,5-diazabicyclo[4.3.0]non-5-ene (DBN), is dissolved in an alcohol, such as methanol, ethanol, propanol, butanol, or ethylene glycol, a ketone, such as acetone, methyl ethyl ketone, methyl amyl ketone, or methyl isobutyl ketone, a cellosolve or a cellosolve ester, such as methyl cellosolve, ethyl cellosolve, or butyl cellosolve, a carbitol or a carbitol ester, such as methyl carbitol, ethyl carbitol, or ethyl carbitol acetate, propylene glycol monomethyl ether, or an ester, such as propylene glycol monomethyl ether acetate, ethyl lactate, or butyl acetate.

The alkaline solution of the novolak phenolic resin may have any pH. However, an excessively low pH results in low solubility of the novolak phenolic resin, and an excessively high pH results in a waste of an alkaline substance added. Thus, the pH of the alkaline solution is preferably in the range of approximately 11 to 13.

The concentration of the novolak phenolic resin in the alkaline solution of the novolak phenolic resin is not particularly limited. However, an excessively high concentration results in an increase in solution viscosity, which makes it difficult to maintain the uniformity of the second-order reaction to which an aldehyde is added and makes the pump feed of the end product difficult. An excessively low concentration results in a decrease in production efficiency and an increase in packaging and transportation costs of the end product. Thus, the novolak phenolic resin concentration is preferably in the range of approximately 5% to 50% by weight, particularly preferably approximately 10% to 30% by weight.

The aldehyde to be added to the alkaline solution of the novolak phenolic resin for the resole-type second-order reaction may be the aldehyde described above serving as the raw material for the novolak phenolic resin alone or in combination. Among these, the aldehyde is practically, but not limited to, formaldehyde or paraformaldehyde.

The amount of aldehyde to be added to the alkaline solution of the novolak phenolic resin is not particularly limited. However, an excessively small amount of aldehyde to be added results in an insufficient decrease in the amount of low-molecular-weight components, such as a dinuclear component, and a small increase in the melting point of the phenolic resin produced in the resole-type second-order reaction (hereinafter also referred to as "second-order reaction phenolic resin"). On the other hand, an excessively large amount of aldehyde to be added results in the melting point of the second-order reaction phenolic resin close to an unmeasurable decomposition temperature, enhanced cross-linking, insolubilization, and solidification. The appropriate amount of aldehyde to be added depends on the percentage of low-molecular-weight components having a molecular weight of 1000 or less, including a dinuclear component, in the raw material novolak phenolic resin or the type of constituent phenol and is generally in the range of 0.2 to 0.4 mol per mol of phenol ring in the novolak phenolic resin. In practice, however, preferably, a preliminary test is performed in advance to examine the relationship between the amount of aldehyde to be added and the melting point of the second-order reaction phenolic resin, and on the basis of the results the amount of aldehyde to be added is determined so as to achieve the desired melting point of the second-order reaction phenolic resin.

The resole-type second-order reaction may be performed by any method. For example, in a reaction system provided with an agitator, a steam blowing apparatus, a reflux condenser, and a temperature control mechanism, an alkaline solution of a novolak phenolic resin having a predetermined resin content and pH is heated to a predetermined temperature, for example, in the range of approximately 40° C. to 70° C. by steam blowing, an aldehyde is added to the alkaline solution, and a resole-type reaction is performed in the presence of an alkaline catalyst at a temperature in the range of 80° C. to 100° C. for 1 to 12 hours while the temperature is maintained at this temperature.

After the completion of the reaction, the reaction solution is cooled to yield an alkaline solution of a second-order reaction phenolic resin, which has a melting point in the range of 130° C. to 220° C., preferably 150° C. to 200° C., contains a decreased amount of low-molecular-weight components having a molecular weight of 1000 or less, such as a dinuclear phenol, and has an increased weight-average molecular weight.

The resin content, the pH, the amount of aldehyde to be added, the reaction temperature, and the reaction time in the second-order reaction are not particularly limited and are appropriately determined so as to produce a second-order reaction phenolic resin having a desired melting point.

The second-order reaction phenolic resin thus produced has a melting point in the range of 130° C. to 220° C., preferably 150° C. to 200° C.

The second-order reaction phenolic resin preferably has a weight-average molecular weight of 5000 or more, more preferably 10000 or more. A weight-average molecular weight of more than 50000 is likely to result in the production of some molecules having a molecular weight of 1,000,000 or more, a high viscosity, further cross-linking with the lapse of time, and the production of insoluble matter. Thus, the second-order reaction phenolic resin preferably has a weight-average molecular weight of 50000 or less, particularly 30000 or less.

Preferably, the second-order reaction phenolic resin has a weight-average molecular weight approximately two to five times the weight-average molecular weight before the reaction, that is, the weight-average molecular weight of the novolak phenolic resin, which is a raw material for the resole-type second-order reaction.

Preferably, the second-order reaction phenolic resin contains less than 3% by weight, particularly 2% by weight or less, of a dinuclear phenol and 10% by weight or less of low-molecular-weight components having a molecular weight of 624 or less. More preferably, the percentage of low-molecular-weight components having a molecular weight of 624 or less is 5% by weight or less. Preferably, the percentage of low-molecular-weight components having a molecular weight of more than 624 and 1200 or less is 10% by weight or less, particularly 7% by weight or less.

In the second-order reaction phenolic resin, low-molecular-weight components having a molecular weight of approximately 1000 or less, including a dinuclear component, are generally significantly decreased to 15% by weight or less, preferably 10% by weight or less, relative to the novolak phenolic resin, which is a raw material for the resole-type second-order reaction. Use of the second-order reaction phenolic resin in the flocculation treatment of water can produce flocculation-treated water that contains a markedly decreased amount of residual nonflocculated substances, has markedly decreased TOC and $COD_{Mn}$, and is preferred as feedwater for membrane separation treatment.

The alkaline solution of the phenolic resin produced by the resole-type second-order reaction is a liquid that can be fed by a pump and can be directly used as a water treatment flocculant.

The following are a method for preparing a sample for melting point measurement, a method for measuring the melting point, a method for preparing a sample for molecular weight or other measurements, and a method for measuring the molecular weight or the like for a second-order reaction phenolic resin or a novolak phenolic resin serving as a raw material for the resole-type second-order reaction in the present invention.

<Method for Preparing Sample for Melting Point Measurement>

An alkaline solution of a second-order reaction phenolic resin is diluted with ion-exchanged water such that the resin content is 1% by weight or less. Approximately 1 N hydrochloric acid is added dropwise to the alkaline solution to adjust the pH of the alkaline solution to less than 5 while the alkaline solution is well stirred with a stirrer or the like. A resin precipitated in this operation is filtered through No. 5A filter paper, is washed twice with ion-exchanged water, is transferred onto another filter paper, and is well dehydrated.

The well-dehydrated resin is dried at normal temperature under vacuum overnight or in a desiccator for several days until the weight loss is not observed.

For a novolak phenolic resin that is a raw material for the resole-type second-order reaction not subjected to the second-order reaction, a sample is prepared from an alkaline solution thereof in the same manner as described above.

<Method for Measuring Melting Point>

A differential scanning calorimetry (DSC) manufactured by SII NanoTechnology Inc. is used for the measurement.

2 mg of a sample is heated at 10° C./rain in a DSC measuring instrument. The heat flow (/mW) is measured as the temperature is increased (horizontal axis). A top temperature of an endothermic peak is considered to be the melting point.

In the present invention, the melting points of a novolak phenolic resin and a second-order reaction phenolic resin are measured in accordance with the sample preparation method and the method for measuring the melting point described above.

<Method for Preparing Sample for Molecular Weight or the Like>

In order to perform molecular weight measurement including fractionation, an alkali metal ion and water must be removed from an alkaline solution of a second-order reaction phenolic resin without discharging low-molecular-weight components, including a dinuclear phenol, in the resin.

Thus, the alkaline solution of the second-order reaction phenolic resin is diluted such that the resin content is approximately 0.1% by weight (1000 mg/L), and is introduced into a dialyzer. After a predetermined amount of hydrochloric acid for neutralization required for the undissociation of a dissociated phenolic hydroxy group is added to the solution in the dialyzer, dialysis is performed. The whole contents including deposits after the dialysis are concentrated to dryness in a flask under vacuum at a low temperature of approximately 40° C.

The product is dried under vacuum at normal temperature and is dissolved in tetrahydrofuran to yield a sample for molecular weight measurement including fractionation.

A raw material novolak phenolic resin before the resole-type second-order reaction is also subjected to the same operation to standardize error factors that can occur in the pretreatment, such as variations in measured values.

<Molecular Weight Fractionation and Molecular Weight Measurement Method>

The molecular weight is measured by gel permeation chromatography (hereinafter referred to as GPC).

A tetrahydrofuran solution of the second-order reaction phenolic resin is developed and eluted with a chromatographic column HLC8022 manufactured by TOSOH CORPORATION using a tetrahydrofuran solvent at a flow rate of 0.8 mL/min at a temperature of 40° C. Resin is detected with a detector RI-8020 and UV-8020 manufactured by TOSOH CORPORATION using refractive index and ultraviolet absorption at a maximum absorption wavelength of 254 nm.

The results are fitted to a calibration curve of polystyrene standards having defined molecular weights to assay molecular weight fractionation and the molecular weight and percentage of fractionated resin components.

The percentages of low-molecular-weight components are calculated by the area ratio (%) based on the whole resin from a GPC molecular weight distribution curve.

The weight-average molecular weight of a phenolic resin and the molecular weight and percentage of low-molecular-weight components in the present invention are determined using the sample preparation method and the molecular weight fractionation and molecular weight measurement method described above.

A water treatment flocculant according to the present invention preferably contains an alkaline solution of a second-order reaction phenolic resin having a melting point in the range of 130° C. to 220° C., preferably 150° C. to 200° C., produced by performing a resole-type second-order reaction of a novolak phenolic resin, as described above, and preferably has a phenolic resin concentration in the range of 10% to 25% by weight and a pH in the range of approximately 11.0 to 13.0.

This water treatment flocculant produces a decreased amount of low-molecular-weight components remaining in treated water irrespective of flocculation and is therefore effective as a water treatment flocculant for use in flocculation treatment serving as a pretreatment process before flocculation treatment, particularly membrane separation treatment, more particularly RO membrane separation treatment, of water and wastewater.

[Water Treatment Method]

A water treatment method according to the present invention involves adding a flocculant to water to be treated to perform flocculation treatment and treating the flocculation-treated water by membrane separation and is characterized in that the flocculant added to the water to be treated is a water treatment flocculant according to the present invention described above.

Target substances on which a water treatment flocculant according to the present invention can particularly exert its flocculation effect are nonionic surfactants and neutral polysaccharides that cannot be treated with common inorganic flocculants, exemplified by aluminum salts, such as poly(aluminum chloride) (PAC), and ferrates, such as iron (III) chloride. These neutral polysaccharides are not anionic or are very slightly anionic.

In RO membrane separation treatment, neutral polysaccharides that cannot be removed by pretreatment flocculation with a common inorganic flocculant remain and contaminate the RO membrane and reduce permeation flux. Thus, a water treatment flocculant and a water treatment method according to the present invention can be effectively used particularly in this field.

When a water treatment flocculant according to the present invention is used in such flocculation treatment, the amount of water treatment flocculant added to water to be treated is appropriately determined in accordance with the quality of water to be treated or intended flocculation treatment effects. Although the amount of water treatment flocculant added to water to be treated depends on the presence or absence of an inorganic flocculant used in combination, it is substantially the same as the amount of nonionic surfactant or neutral polysaccharide, which is a flocculation target for a water treatment flocculant according to the present invention. For example, when the water treatment flocculant is used in a pretreatment process before a membrane separation treatment process, such as RO membrane separation treatment, the amount of water treatment flocculant added is preferably in the range of approximately 0.1 to 5.0 mg/L, particularly 0.3 to 2.0 mg/L, based on phenolic resin.

When a water treatment flocculant according to the present invention is used in flocculation treatment that serves as a pretreatment process before membrane separation treatment, in particular, using an RO membrane, an ultrafiltration membrane, or a microfiltration membrane, the water treatment flocculant according to the present invention is preferably used in combination with an inorganic flocculant.

Examples of the inorganic flocculant include, but are not limited to, aluminum flocculants, such as poly(aluminum chloride) (PAC), aluminum sulfate, and aluminum chloride, and iron flocculants, such as iron(III) chloride, iron(III) sulfate, and polyferric sulfate, used alone or in combination.

The amount of inorganic flocculant to be added depends on the quality of water to be treated or the intended quality of treated water. In the case that the water to be treated is industrial water and that the inorganic flocculant is used in a pretreatment process before a membrane separation process, the amount of inorganic flocculant is generally in the range of approximately 20 to 100 mg/L. In the case that the water to be treated is primary treatment water of wastewater, such as biological treatment water and that the inorganic flocculant is used in a pretreatment process before a membrane separation process, the amount of inorganic flocculant is generally in the range of approximately 100 to 400 mg/L.

When a water treatment flocculant according to the present invention and an inorganic flocculant are used in combination in flocculation treatment that serves as pretreatment before membrane separation treatment, the addition of the water treatment flocculant according to the present invention to water to be treated is followed by the addition of the inorganic flocculant. More specifically, preferably, a water treatment flocculant according to the present invention is added to water to be treated and is allowed to react for 1 minute or more, an inorganic flocculant is then added to the water and is allowed to react for approximately 3 to 10 minutes with rapid agitation and approximately 3 to 10 minutes with slow agitation, the resulting flocculation-treated liquid is subjected to primary solid-liquid separation in a settling tank, a pressure flotation apparatus, or the like and secondary solid-liquid separation in a gravity filtration apparatus, and separated water is used as feedwater for membrane separation treatment.

Simultaneous addition of a water treatment flocculant according to the present invention and an inorganic flocculant to water to be treated, or the addition of an inorganic flocculant to a portion close to a portion to which a water treatment flocculant according to the present invention has been added causes a direct reaction between a phenolic resin and the inorganic flocculant, resulting in little effect of the addition of the phenolic resin. Thus, the amounts of agents must be increased to compensate for the agents consumed by the reaction.

Except the case that water to be treated is high-salt-content water having an electrical conductivity of 1000 mS/m or more, such as seawater, the addition of a water treatment flocculant according to the present invention after the addition of an inorganic flocculant results in the presence of residual nonflocculated phenolic resin, which acts as a membrane separation inhibitor and increases MFF.

EXAMPLES

The present invention will be further described in the following examples.

In the following description, "%" refers to "% by weight".

The melting point, measured in accordance with <Method for Measuring Melting Point> described above, of a sample prepared in accordance with <Method for Preparing Sample for Melting Point Measurement> described above is referred to simply as "melting point". The catalog value of a resin or the melting point of a sample resin not dissolved in an alkaline solution is referred to as "original resin melting point".

[Production of Alkaline Solution of Second-Order Reaction Phenolic Resin]

RESITOP PSM-6358 and PSM-4324 manufactured by Gun Ei Chemical Industry Co., Ltd were used as raw material resins. These products are novolak phenolic resins produced by polycondensation between phenol and formaldehyde in the presence of an acid catalyst and have the following melting points, weight-average molecular weights, and low-molecular-weight component contents.

TABLE 1

|  | PSM-6358 | PSM-4324 |
|---|---|---|
| Original resin melting point (° C.) | 67 | 63 |
| Melting point (° C.) | 71 | 67 |
| Weight-average molecular weight | 5400 | 2300 |

TABLE 1-continued

|  | PSM-6358 | PSM-4324 |
|---|---|---|
| Dinuclear phenol content (%) | 3.8 | 7.4 |
| Percentage of low-molecular-weight components having molecular weight of 1000 or less (%) | 29 | 37 |

PSM-6358 and PSM-4324 are mainly used as epoxy curing agents for electronic material laminated sheets and are not used as water treatment flocculants.

Example I-1

41 g of PSM-6358, 146.2 g of ion-exchanged water, and 12.8 g of 48% aqueous sodium hydroxide in a beaker were dissolved while stirring with a magnetic stirrer to yield 200 g of an alkaline solution of a novolak phenolic resin that contains 20.5% PSM-6358. This solution had a pH of 12.4.

A 200 mL Erlenmeyer flask having a stopper was charged with 100 g of an alkaline solution of PSM-6358 and was heated to approximately 60° C. 4.43 g of 37% formaldehyde aqueous solution was added to the alkaline solution. A condenser, a tube for blowing nitrogen gas for agitation, and a thermometer were attached to the stopper. Formaldehyde addition and polycondensation of a resole type were performed in an oil bath at a liquid temperature of 85° C. for 8 hours (a resole-type second-order reaction). The amount of formaldehyde used here corresponds to 28% by mole based on the phenol ring (molecular weight 106) of PSM-6358 (PSM-6358: 20.5 g, 20.5/106=0.193 mol, formaldehyde 4.43×0.37=1.64 g, 1.64/30=0.055 mol, thus 0.055/0.193=0.28). After cooling, 4.46 g of ion-exchanged water (ion-exchanged water for concentration adjustment) was added to decrease the percentage of low-molecular-weight components including a dinuclear phenol, yielding an alkaline solution of a second-order reaction phenolic resin that has an increased weight-average molecular weight and a high melting point (hereinafter referred to as "synthetic product A according to the present invention").

Example I-2

An alkaline solution of a second-order reaction phenolic resin (hereinafter referred to as "synthetic product B according to the present invention") was prepared in the same manner as in Example I-1 except that PSM-6358 was replaced by PSM-4324.

Example I-3

An alkaline solution of a second-order reaction phenolic resin (hereinafter referred to as "synthetic product C according to the present invention") was prepared in the same manner as in Example I-1 except that the amount of 37% formaldehyde aqueous solution added in the resole-type second-order reaction was 3.9 g and that the amount of ion-exchanged water for concentration adjustment added after the completion of the resole-type second-order reaction was 4.59 g.

Example I-4

An alkaline solution of a second-order reaction phenolic resin (hereinafter referred to as "synthetic product D according to the present invention") was prepared in the same manner as in Example I-1 except that the amount of 37% formaldehyde aqueous solution added in the resole-type second-order reaction was 3.2 g and that the amount of ion-exchanged water for concentration adjustment added after the completion of the resole-type second-order reaction was 4.76 g.

Example I-5

An alkaline solution of a second-order reaction phenolic resin (hereinafter referred to as "synthetic product E according to the present invention") was prepared in the same manner as in Example I-1 except that the amount of 37% formaldehyde aqueous solution added in the resole-type second-order reaction was 5.0 g and that the amount of ion-exchanged water for concentration adjustment added after the completion of the resole-type second-order reaction was 4.33 g.

Comparative Example I-1

An alkaline solution of a second-order reaction phenolic resin (hereinafter referred to as "comparative synthetic product F") was prepared in the same manner as in Example I-1 except that the amount of 37% formaldehyde aqueous solution added in the resole-type second-order reaction was 2.5 g and that the amount of ion-exchanged water for concentration adjustment added after the completion of the resole-type second-order reaction was 4.92 g.

Comparative Example I-2

An alkaline solution of a second-order reaction phenolic resin (hereinafter referred to as "comparative synthetic product G") was prepared in the same manner as in Example I-1 except that the amount of 37% formaldehyde aqueous solution added in the resole-type second-order reaction was 5.6 g and that the amount of ion-exchanged water for concentration adjustment added after the completion of the resole-type second-order reaction was 4.19 g.

Comparative Example I-3

100 g of an alkaline solution of a resin raw material PSM-6358 was mixed with 5.52 g of ion-exchanged water in Example I-1 to produce a comparative preparation product H.

Comparative Example I-4

5.52 g of ion-exchanged water was mixed with 100 g of an alkaline solution of a resin raw material PSM-4324 in Example I-2 to produce a comparative preparation product I.

The resin content of each of alkaline solutions of the synthetic products A to E according to the present invention, the comparative synthetic products F and G, and the comparative preparation products H and I was 19.43%, including resinified formaldehyde in the resole-type second-order reaction.

[Measurement of Melting Point, Molecular Weight, and Low-Molecular-Weight Component Content]

The synthetic products A to E according to the present invention, the comparative synthetic products F and G, and the comparative preparation products H and I were subjected to molecular weight fractionation by the method described above, and the phenol (monomer), dinuclear phenol, and low-molecular-weight component contents were assayed and were shown in Table 2.

The melting points were measured by the method described above and were shown in Table 2.

Phenol (monomer) was separately analyzed in accordance with JIS K-6910-7.22.

[Evaluation of Storage Stability Under Heating]

50 mL of an alkaline solution of a phenolic resin of each of the synthetic products A to E according to the present invention, the comparative synthetic products F and G, and the comparative preparation products H and I was hermetically sealed in 50-mL polyethylene container. After storage at 60° C. for 1 or 3 months, variations in flowability were visually observed to examine storage stability under heating and were shown in Table 2.

The following are evaluation criteria for storage stability under heating.

O: Excellent with no difference in flowability between before storage and after storage Δ: When the container is laid down, the liquid surface moves slowly.

X: Even when the container is inverted, the liquid does not drip.

Table 2 also lists the molar amount of formaldehyde per mol of phenol ring contained in an alkaline solution of a novolak phenolic resin subjected to the resole-type second-order reaction in each example.

TABLE 2

| | Sample name | Raw material resin | Presence of resole-type second-order reaction* | Melting point (° C.) | Weight-average molecular weight | Phenol (monomer) | Percentage of low-molecular-weight components (%) Dinuclear phenol Polystyrene equivalent molecular weight of more than 170 and 280 or less |
|---|---|---|---|---|---|---|---|
| Example I-1 | Synthetic product A according to the present invention | PSM-6358 | Yes (0.28) | 183 | 13400 | Less than 0.1 | 0.6 |
| Example I-2 | Synthetic product B according to the present invention | PSM-4324 | Yes (0.28) | 153 | 7300 | Less than 0.1 | 1.4 |
| Example I-3 | Synthetic product C according to the present invention | PSM-6358 | Yes (0.25) | 151 | 9800 | Less than 0.1 | 1.2 |
| Example I-4 | Synthetic product D according to the present invention | PSM-6358 | Yes (0.20) | 132 | 7100 | Less than 0.1 | 1.9 |
| Example I-5 | Synthetic product E according to the present invention | PSM-6358 | Yes (0.32) | 213 | 30000 | Less than 0.1 | 0.2 |
| Comparative Example I-1 | Comparative synthetic product F | PSM-6358 | Yes (0.16) | 125 | 6300 | Less than 0.1 | 3.3 |
| Comparative Example I-2 | Comparative synthetic product G | PSM-6358 | Yes (0.36) | 233 | 1,000,000 or more | Less than 0.1 | 0.1 |
| Comparative Example I-3 | Comparative preparation product H | PSM-6358 | No | 71 | 5400 | Less than 0.1 | 4.8 |
| Comparative Example I-4 | Comparative preparation product I | PSM-4324 | No | 67 | 2300 | Less than 0.1 | 8.2 |

| | Percentage of low-molecular-weight components (%) Other low-molecular-weight components | | | | Storage stability under heating | |
|---|---|---|---|---|---|---|
| | Polystyrene equivalent molecular weight of more than 280 and 624 or less | Polystyrene equivalent molecular weight of more than 624 and 1200 or less | Total of polystyrene equivalent molecular weight of 624 or less | Polystyrene equivalent molecular weight of 1000 or less | Storage for 1 month | Storage for 3 months |
| Example I-1 | 3.4 | 4.1 | 4.0 | 6.9 | O | O |
| Example I-2 | 3.4 | 6.6 | 4.8 | 9.3 | O | O |
| Example I-3 | 3.4 | 6.2 | 4.6 | 8.9 | O | O |
| Example I-4 | 4.6 | 9.2 | 6.5 | 13.3 | O | O |
| Example I-5 | 1.8 | 3.7 | 2.0 | 4.1 | O | O |
| Comparative Example I-1 | 7.2 | 10.3 | 10.5 | 17.8 | O | O |
| Comparative Example I-2 | 0.8 | 2.5 | 0.9 | 2.5 | Δ | X |
| Comparative Example I-3 | 12.2 | 16.5 | 17.0 | 28.6 | O | O |

TABLE 2-continued

| | | | | | | |
|---|---|---|---|---|---|---|
| Comparative Example I-4 | 14.8 | 22.9 | 23.0 | 39.3 | ○ | ○ |

*The values in parentheses are the molar amount of formaldehyde per mol of phenol ring contained in an alkaline solution of a novolak phenolic resin subjected to the resole-type second-order reaction.

Table 2 shows the following.

The synthetic products A and C to E according to the present invention and the synthetic product B according to the present invention had a significantly decreased low-molecular-weight component content, an increased melting point, and an increased weight-average molecular weight as compared with the comparative preparation products H and I, respectively, thus having physical properties suitable as water treatment flocculants.

The comparative synthetic product F, which had a melting point as low as 125° C., had poor performance as a water treatment flocculant, as shown below in Table 3. After storage at 60° C. for 1 month, the comparative synthetic product G, which had a melting point as high as 233° C., lost flowability, formed a solid, and cannot be used as a flocculant.

[Evaluation of Performance as Water Treatment Flocculant]

The synthetic products A to E according to the present invention, the comparative synthetic product F, and the comparative preparation products H and I were evaluated as water treatment flocculants.

{Flocculation Treatment of Nonionic Surfactant Synthetic Wastewater}

The application of an inorganic flocculant is indispensable to flocculation for water treatment. Representative examples of the inorganic flocculant include poly(aluminum chloride) (PAC), aluminum sulfate, and iron(III) chloride. The function of the inorganic flocculant is to neutralize the charge of a suspensoid that is generally negatively charged and is stably dispersed by electrostatic repulsion in water to be treated (hereinafter referred to as "raw water") to coagulate or flocculate the suspensoid.

A representative substance that is difficult to remove by flocculation with an inorganic flocculant is a nonionic surfactant. The nonionic surfactant has no charge and no electrostatic interaction with an inorganic flocculant and therefore cannot be coagulated or flocculated with the inorganic flocculant.

The evaluation of flocculation treatment performance using nonionic surfactant synthetic wastewater as raw water was performed by the following method. The nonionic surfactant synthetic wastewater contained 20 mg/L of a nonionic surfactant polyoxyethylene alkylphenyl ether having high hydrophilicity of HLB 15 (Miyoshi 1230) dissolved in tap water of Nogi-machi in Tochigi Prefecture. Table 3 shows the results.

The synthetic wastewater had a TOC of 16.5 mg/L (subtracting 0.5 mg/L responsible for the tap water of Nogi-machi yields 16.0 mg/L responsible for the surfactant) and a $COD_{Mn}$ of 12.2 mg/L (likewise, subtracting 0.4 mg/L yields 11.8 mg/L responsible for the surfactant).

Examples II-1 to II-4

The synthetic wastewater was taken into a 500-mL beaker, which was then placed in a jar tester. 9.7, 19.4, 29.1, or 38.9 mg/L of the synthetic product A according to the present invention was added to the synthetic wastewater as a resin component and was rapidly agitated at 150 rpm for 2 minutes. 100 mg/L of PAC was then added to the synthetic wastewater, which was then rapidly agitated at 150 rpm for 2 minutes and then slowly agitated at 50 rpm for 5 minutes. After leaving the synthetic wastewater still for 30 minutes, the supernatant water was filtered through No. 5A filter paper to yield treated water. Soluble TOC in the filter paper had been washed away with pure water.

The TOC of treated water decreased with an increase in the amount of synthetic product A according to the present invention (melting point 183° C.) added. When the amount of synthetic product A was 29.1 mg/L, the TOC was decreased from 16.0 mg/L of the synthetic wastewater to the lowest 3.6 mg/L.

As with TOC, the addition of 29.1 mg/L of the synthetic product A according to the present invention resulted in the lowest $COD_{Mn}$ of the treated water, 3.4 mg/L. With the addition of 38.9 mg/L of the synthetic product A according to the present invention, the TOC and $COD_{Mn}$ of the treated water began to increase. This is because a low-molecular-weight phenolic resin fraction in the treated water gradually increased with the amount of synthetic product A according to the present invention, although the surfactant was almost completely removed and the low-molecular-weight phenolic resin fraction is small.

Examples II-5 to II-8

The synthetic product B according to the present invention (melting point 153° C.), the synthetic product C according to the present invention (melting point 151° C.), the synthetic product D according to the present invention (melting point 132° C.), and the synthetic product E according to the present invention (melting point 213° C.) were tested in the same manner at the optimum amount of synthetic product A according to the present invention in Examples II-1 to II-4, that is, 29.1 mg/L. Each of the synthetic products according to the present invention had a TOC of treated water of 7.4 mg/L or less, which was 50% or more decrease based on the TOC of the raw water 16.0 mg/L.

The $COD_{Mn}$ of the treated water was 6.9 mg/L or less, which was 40% or more decrease based on the $COD_{Mn}$ of the raw water 11.8 mg/L.

Comparative Example II-1

The comparative synthetic product F (melting point 125° C.) was tested in the same manner as in Example II-5. Although the TOC and $COD_{Mn}$ of the treated water were lower than the TOC and $COD_{Mn}$ of the raw water, these were obviously inferior to Examples II-1 to II-8.

Comparative Examples II-2 and II-3

The comparative preparation product H (melting point 71° C.) and the comparative preparation product I (melting point 67° C.) were tested in the same manner as in Example II-5. The TOC and $COD_{Mn}$ of the treated water were higher than the TOC and $COD_{Mn}$ of the raw water.

Comparative Example II-4

A test was performed in the same manner as in Example II-1 with 100 mg/L of PAC alone without using the synthetic product A according to the present invention. The TOC and $COD_{Mn}$ of the treated water were substantially the same as the raw water. The surfactant could not be removed.

Evaluation was performed by measuring the TOC of flocculation-treated filtered water and the membrane filtration indicator MFF.

TABLE 3

| | | Alkaline solution of phenolic resin | | | Treated water* | |
|---|---|---|---|---|---|---|
| | Type | Amount of alkaline solution added (mg/L) | Amount of phenolic resin added (mg/L) | Amount of PAC added (mg/L) | TOC (mg/L) | $COD_{Mn}$ (mg/L) |
| Example II-1 | Synthetic product A according to the present invention | 50 | 9.7 | 100 | 9.9 | 7.5 |
| Example II-2 | Synthetic product A according to the present invention | 100 | 19.4 | 100 | 5.4 | 4.5 |
| Example II-3 | Synthetic product A according to the present invention | 150 | 29.1 | 100 | 3.6 | 3.4 |
| Example II-4 | Synthetic product A according to the present invention | 200 | 38.9 | 100 | 4.1 | 4.0 |
| Example II-5 | Synthetic product B according to the present invention | 150 | 29.1 | 100 | 6.0 | 5.7 |
| Example II-6 | Synthetic product C according to the present invention | 150 | 29.1 | 100 | 4.5 | 4.3 |
| Example II-7 | Synthetic product D according to the present invention | 150 | 29.1 | 100 | 7.4 | 6.9 |
| Example II-8 | Synthetic product E according to the present invention | 150 | 29.1 | 100 | 3.0 | 2.9 |
| Comparative Example II-1 | Comparative synthetic product F | 150 | 29.1 | 100 | 11.2 | 10.6 |
| Comparative Example II-2 | Comparative preparation product H | 150 | 29.1 | 100 | 17.6 | 16.8 |
| Comparative Example II-3 | Comparative preparation product I | 150 | 29.1 | 100 | 26.9 | 25.4 |
| Comparative Example II-4 | None | | | 100 | 15.7 | 11.6 |

Note:
TOC and CODMn in the table were given by subtracting TOC 0.5 mg/L and CODMn 0.4 mg/L of tap water of Nogi-machi.

{Flocculation Treatment of Neutral Polysaccharide Synthetic Wastewater}

In separation treatment with a membrane, such as an RO membrane, membrane contaminants include polysaccharides produced by the metabolism of algae or microorganisms, such as activated sludge microorganisms. Among the polysaccharides, neutral polysaccharides that are not anionic or are very slightly anionic cannot be treated with inorganic flocculants. Thus, it is important to develop a method for efficiently removing neutral polysaccharides particularly by flocculation treatment.

The flocculation treatment performance was evaluated using tap water containing pullulan as a raw water. Pullulan is one of neutral polysaccharides. Table 4 shows the results.

Pullulan manufactured by Tokyo Chemical Industry Co., Ltd. was dissolved in tap water of Nogi-machi at a concentration of 5 mg/L to prepare synthetic wastewater. The tap water of Nogi-machi filtered through No. 5A filter paper had a TOC of 0.45 mg/L and a membrane filtration indicator MFF of 1.042.

The TOC of the synthetic wastewater containing 5 mg/L of dissolved pullulan was 2.25 mg/L after the TOC of tap water of Nogi-machi 0.45 mg/L was subtracted, and the membrane filtration indicator MFF disadvantageously increased to 1.124.

The procedures are described below.

(1) The temperature of the raw water was adjusted to 22° C.±2° C. 1100 L of the raw water was taken into a beaker. A jar test was performed with MJS-6 manufactured by MIYAMOTO CORPORATION.

The reaction conditions were as follows: a predetermined amount of alkaline solution of a phenolic resin was added to the raw water and was allowed to react at 150 rpm for 3 minutes, and 100 mg/L of PAC was then added to the raw water and was allowed to react at 150 rpm for 10 minutes and at 50 rpm for 7 minutes while stirring (only the addition of PAC in Comparative Example III-4).

(2) After flocculation-treated water was settled for approximately 30 minutes, the whole contents including flock were filtered through No. 5A filter paper. Soluble TOC in the filter paper had been washed away with pure water.

(3) 1000 mL of the resulting filtered water was divided into 500 mL in two cylinders.

(4) 500 mL of the filtered water was filtered through a Millipore nitrocellulose membrane filter having a pore size of 0.45 μm and 47ϕ at a reduced pressure of 66 kPa (500 mmHg), and the filtration time T1 was measured. In the same manner, the other 500 mL was filtered under vacuum, and the filtration time T2 was measured. The laboratory temperature was adjusted such that the water temperature was 22° C.±2° C. at the time of measurement. The water temperature at the time of measurement was recorded.

(5) MFF was calculated as the ratio of T2/T1. Pure water without contaminants had T1=T2 and MFF of 1.00. MFF suitable for RO membrane feedwater was less than 1.10. Further satisfactory MFF was less than 1.05.

(6) With residual filtered water, the ultraviolet absorbance of the phenolic resin was measured with a 50-mm cell at an absorption peak wavelength of 280 nm. Total organic carbon (TOC) was measured.

(7) Pullulan has no ultraviolet absorption at a wavelength of 280 nm. Thus, the residual components of the phenolic resin are considered to be responsible for a difference between the ultraviolet absorbance at a wavelength of 280 nm and the ultraviolet absorbance at a wavelength of 280 nm measured in treatment with 100 mg/L of PAC alone in Comparative Example III-4 (Δ280 nm). Thus, the residual concentration was determined from a phenolic resin concentration-absorbance calibration curve (phenolic resin concentration=Δ280/0.093).

Examples III-1 to III-3

The addition of 1.6, 3.1, or 4.7 mg/L of the synthetic product A according to the present invention (melting point 183° C.) as a resin component promoted the removal of pullulan, and the removal rate was 30%, 45%, or 60%, respectively.

At a pullulan removal rate of 30%, the membrane filtration indicator MFF was 1.033, which was advantageously lower than the MFF of tap water. This is probably because while the membrane filtration preventing effect of a polysaccharide increases with the molecular weight of the polysaccharide, and a polysaccharide probably having a molecular weight of 1000 or less probably has a small membrane filtration preventing effect, the removal of pullulan by flocculation with a phenolic resin subjected to the resole-type second-order reaction is promoted as the molecular weight of pullulan increases.

Examples III-4 to III-7

The synthetic product B according to the present invention (melting point 153° C.), the synthetic product C according to the present invention (melting point 151° C.), the synthetic product D according to the present invention (melting point 132° C.), and the synthetic product E according to the present invention (melting point 213° C.) were evaluated at an addition level of 3.1 mg/L, at which the synthetic product A according to the present invention had excellent membrane filtration of MFF 1.024 and a pullulan removal rate of 45%. Any of these synthetic products had excellent results: the MFF of treated water was in the range of 1.020 to 1.033, and the pullulan removal rate was in the range of 39% to 47%.

Comparative Example III-1

The comparative synthetic product F, which had a melting point of less than 130° C., that is, 125° C., in spite of the resole-type second-order reaction, had an MFF of 1.041 at an addition level of 3.1 mg/L, which was comparable to the MFF of tap water of Nogi-machi, but a pullulan removal rate of 26%, which was inferior to any of the examples.

Comparative Examples III-2 and III-3

The comparative preparation product H having a melting point of 71° C. and the comparative preparation product I having a melting point of 67° C., which had not been subjected to the resole-type second-order reaction, had an improved MFF as compared with Comparative Example III-4, which involved the addition of 100 mg/L of PAC alone, but did not reach the MFF level of the tap water.

Furthermore, because of a large amount of residual low-molecular-weight components, their TOCs were higher than the TOC of the synthetic raw water. Thus, the comparative preparation products H and I were also inappropriate as flocculants for wastewater purification.

Comparative Example III-4

Although the treatment with 100 mg/L of an inorganic flocculant PAC alone improved MFF as compared with the raw water, the MFF was 1.162, which was much inferior to the MFF 1.041 of the tap water containing no pullulan. The pullulan removal rate was as low as 4%.

TABLE 4

|  | Type | Alkaline solution of phenolic resin | | Amount of PAC added (mg/L) | TOC of treated water*1 (mg/L) | Residual phenolic resin concentration of treated water*2 (mg/L) | TOC of residual pullulan of treated water*3 (mg/L) | Pullulan removal rate (%) | MFF of treated water* |
|---|---|---|---|---|---|---|---|---|---|
|  |  | Amount of alkaline solution added (mg/L) | Amount of phenolic resin added (mg/L) |  |  |  |  |  |  |
| Tap water of Nogi-machi | No pullulan | — | — | — | (0.45) | — | — | — | 1.042 |
| Raw water |  | — | — | — | 2.25 | — | — | — | 1.242 |
| Example III-1 | Synthetic product A according to the present invention | 8 | 1.6 | 100 | 1.63 | 0.07 | 1.58 | 30 | 1.033 |
| Example III-2 | Synthetic product A according to the present invention | 16 | 3.1 | 100 | 1.33 | 0.13 | 1.24 | 45 | 1.024 |
| Example III-3 | Synthetic product A according to the present invention | 24 | 4.7 | 100 | 1.04 | 0.21 | 0.90 | 60 | 1.021 |

TABLE 4-continued

|  |  | Alkaline solution of phenolic resin | | Amount of PAC added (mg/L) | TOC of treated water*1 (mg/L) | Residual phenolic resin concentration of treated water*2 (mg/L) | TOC of residual pullulan of treated water*3 (mg/L) | Pullulan removal rate (%) | MFF of treated water* |
|---|---|---|---|---|---|---|---|---|---|
|  | Type | Amount of alkaline solution added (mg/L) | Amount of phenolic resin added (mg/L) |  |  |  |  |  |  |
| Example III-4 | Synthetic product B according to the present invention | 16 | 3.1 | 100 | 1.48 | 0.22 | 1.33 | 41 | 1.033 |
| Example III-5 | Synthetic product C according to the present invention | 16 | 3.1 | 100 | 1.39 | 0.17 | 1.28 | 43 | 1.027 |
| Example III-6 | Synthetic product D according to the present invention | 16 | 3.1 | 100 | 1.55 | 0.26 | 1.37 | 39 | 1.029 |
| Example III-7 | Synthetic product E according to the present invention | 16 | 3.1 | 100 | 1.27 | 0.11 | 1.19 | 47 | 1.020 |
| Comparative Example III-1 | Comparative synthetic product F | 16 | 3.1 | 100 | 1.95 | 0.41 | 1.67 | 26 | 1.041 |
| Comparative Example III-2 | Comparative preparation product H | 16 | 3.1 | 100 | 2.27 | 0.72 | 1.78 | 21 | 1.047 |
| Comparative Example III-3 | Comparative preparation product I | 16 | 3.1 | 100 | 2.55 | 1.03 | 1.85 | 18 | 1.058 |
| Comparative Example III-4 | None | — | — | 100 | 2.16 | — | 2.16 | 4 | 1.162 |

*1TOC of treated water was given by subtracting TOC 0.45 mg/L of tap water of Nogi-machi.
*2The phenolic resin had an ultraviolet absorption peak at a wavelength of 280 nm. In contrast, pullulan does not have an ultraviolet absorption peak at a wavelength of 280 nm. Thus, the residual phenolic resin concentration was determined on the basis of a difference from ultraviolet absorbance at a wavelength of 280 nm measured in treatment with 100 mg/L of PAC alone in Comparative Example III-4.
*3The residual pullulan concentration was given by subtracting the TOC of pullulan from the TOC of the treated water. The TOC of pullulan was considered to be the residual phenolic resin concentration × 0.68.
*4Examples III-1 to III-7 and Comparative Example III-1 had a lower MFF than the tap water of Nogi-machi.

{Flocculation Treatment and RO Membrane Separation Treatment of Biologically-Treated Water}
[Flocculation Treatment]

The jar test, filtration through No. 5A filter paper, MFF measurement, and the measurement of ultraviolet absorbance at 280 nm were performed in the same manner as in the flocculation treatment of neutral polysaccharide synthetic wastewater as described above except that biologically-treated water of F factory was used as a raw water and that 400 mg/L of polyferric sulfate was used as an inorganic flocculant in place of PAC. In the F factory, wastewater of a liquid crystal manufacturing process was subjected to biological treatment including denitrification and then flocculation treatment with polyiron sulfate and was recovered by RO membrane separation treatment.

The residual phenolic resin concentration was calculated in the same manner as in the flocculation treatment of neutral polysaccharide synthetic wastewater described above. However, the residual phenolic resin concentration was considered to be a reference value because part of components having absorbance at a wavelength of 280 nm in the raw water may be removed by flocculation with the phenolic resin.

Table 5 shows the results for the synthetic product A according to the present invention, the synthetic product C according to the present invention, the comparative synthetic product F, and the comparative preparation product H when the amount of phenolic resin added was changed to 0.97, 1.36, and 1.94 mg/L and when polyferric sulfate was used alone.

Examples IV-1 to IV-6

With both the synthetic product A according to the present invention (melting point 183° C.) and the synthetic product C according to the present invention (melting point 151° C.), the treated water had a satisfactory MFF level of less than 1.1 by the addition of 1.36 mg/L of the phenolic resin, and the residual resin caused a very small increase in ultraviolet absorbance at 280 nm.

Comparative Examples IV-1 to IV-6

The comparative synthetic product F (melting point 125° C.), which had been subjected to the resole-type second-order reaction, had a low melting point and probably contained an insufficiently decreased amount of low-molecular-weight components. The comparative synthetic product F had a higher residual phenolic resin concentration than Examples IV-1 to IV-6. It was also considered that the molecular weight of the comparative synthetic product F was insufficiently increased. With the addition of 1.36 mg/L of the comparative synthetic product F, the treated water could not have a satisfactory MFF level of less than 1.1.

The comparative preparation product H (melting point 71° C.) had results further inferior to the results of the comparative synthetic product F.

Comparative Example IV-7

Treatment with 400 mg/L of polyferric sulfate alone provided a poor membrane filtration indicator MFF of 1.354.

TABLE 5

|  | Alkaline solution of phenolic resin | | | | | Residual |
| --- | --- | --- | --- | --- | --- | --- |
|  | Type | Amount of alkaline solution added (mg/L) | Amount of phenolic resin added (mg/L) | Amount of polyferric sulfate added (mg/L) | MFF of Treated water | UV280 absorbance | phenolic resin concentration (reference) (mg/L) |
| Example IV-1 | Synthetic product A according to the present invention | 5 | 0.97 | 400 | 1.170 | 0.187 | 0.01 |
| Example IV-2 | Synthetic product A according to the present invention | 7 | 1.36 | 400 | 1.084 | 0.188 | 0.02 |
| Example IV-3 | Synthetic product A according to the present invention | 10 | 1.94 | 400 | 1.062 | 0.190 | 0.04 |
| Example IV-4 | Synthetic product C according to the present invention | 5 | 0.97 | 400 | 1.187 | 0.188 | 0.02 |
| Example IV-5 | Synthetic product C according to the present invention | 7 | 1.36 | 400 | 1.090 | 0.189 | 0.03 |
| Example IV-6 | Synthetic product C according to the present invention | 10 | 1.94 | 400 | 1.067 | 0.192 | 0.06 |
| Comparative Example IV-1 | Comparative synthetic product F | 5 | 0.97 | 400 | 1.243 | 0.195 | 0.10 |
| Comparative Example IV-2 | Comparative synthetic product F | 7 | 1.36 | 400 | 1.129 | 0.202 | 0.17 |
| Comparative Example IV-3 | Comparative synthetic product F | 10 | 1.94 | 400 | 1.087 | 0.211 | 0.27 |
| Comparative Example IV-4 | Comparative preparation product H | 5 | 0.97 | 400 | 1.312 | 0.205 | 0.20 |
| Comparative Example IV-5 | Comparative preparation product H | 7 | 1.36 | 400 | 1.187 | 0.214 | 0.30 |
| Comparative Example IV-6 | Comparative preparation product H | 10 | 1.94 | 400 | 1.092 | 0.228 | 0.45 |
| Comparative Example IV-7 | — | — | — | 400 | 1.354 | 0.186 | |

[RO Membrane Separation Treatment]

The jar test and filtration were repeatedly performed to produce approximately 20 L of flocculation-treated water in Examples IV-2 (synthetic product A according to the present invention: 1.36 mg/L) and IV-5 (synthetic product C according to the present invention: 1.36 mg/L) and Comparative Examples IV-3 (comparative synthetic product F: 1.94 mg/L) and IV-6 (comparative preparation product H, 1.94 mg/L), each having a satisfactory MFF level of less than 1.1, and Comparative Example IV-7 having an MFF of 1.354 with polyferric sulfate alone. Tables 6 to 10 show the results of the flat membrane test of these examples.

In the flat membrane test, flocculation-treated water (feedwater) is passed through an actual RO membrane piece under pressure to measure water-permeation rate, thus assaying a decrease in permeation flux per unit membrane area ($m^3/m^2 \cdot h$) as a function of time. On the basis of this result, the clogging condition of an RO membrane module through which flocculation-treated water practically flows, in other words, the continuous flow time can be estimated.

A test apparatus illustrated in FIG. 1 was used. Flocculation-treated water (RO membrane feedwater) was supplied to a raw water chamber 1A at a constant rate of 0.7 mL/min through a pipe 11 with a high pressure pump 4. The raw water chamber 1A was disposed in an airtight container 1 under a flat membrane cell 2, on which an RO membrane was mounted. The interior of the raw water chamber 1A was agitated with a stirring bar 5 rotated by a stirrer 3. The internal pressure of the airtight container was adjusted to 0.75 MPa with a pressure gauge 6 and a pressure-regulating valve 7 installed on a concentrated water discharge pipe 13. The water-permeation rate was measured under this condition.

The RO membrane was a polyamide membrane ES-20 (product name) manufactured by Nitto Denko Corp. The flat membrane cell had a filtration area of 8.04 cm$^2$.

The test was performed at a temperature that was not significantly different from the room temperature of 25° C. The water temperature t of permeated water was measured. With conversion into a water temperature of 25° C., the permeation flux was calculated in accordance with the following formula.

Permeation flux=Water-permeation rate×Temperature correction factor($1.024^{(25-t)}$)/Flat membrane area (unit: $m^3/m^2 \cdot h$)

Evaluation was performed by calculating the flux decline slope (hereinafter referred to as "m value") as a decline indicator for permeation flux as a function of time.

The equation and evaluation of the m value are described below.

$m$ value=(log initial permeation flux−log permeation flux at elapsed time $T$)/(log initial time(generally 1h)−log elapsed time $T$)

The m value is a minus value. The following are the relationships between the m value and the elapsed time before the permeation flux decreases to 80% of the initial value (20% decrease).

m=−0.02: calculated elapsed time before decrease 70000 h (8 years)

m=−0.025: calculated elapsed time before decrease 7500 h (10 months)

m=−0.03: calculated elapsed time before decrease 1700 h (2.3 months)

m=−0.035: calculated elapsed time before decrease 587 h (0.8 months)

m=−0.04: calculated elapsed time before decrease 265 h (11 days)

In general, in the case that the raw water is industrial water and has been fully subjected to flocculation treatment and gravity filtration treatment, the m value is approximately −0.02. In the case that the raw water is wastewater used once and has been subjected to flocculation treatment and gravity filtration, the m value is roughly −0.04 or more (the absolute value is 0.04 or less).

When water flows through an RO membrane, the permeation flux decreases with time. In response to the decrease, the water supply pressure is increased to maintain the initial permeation flux. In general, with a decrease to approximately 80%, the water supply is stopped, and the membrane is washed. As this procedure is performed repeatedly, the degree of recovery of permeation flux decreases, and finally the membrane is replaced.

The calculated elapsed time before a decrease in permeation flux based on the m value reflects a decrease in permeation flux caused by fine particles and soluble organic substances associated with membrane feedwater. In practice, the calculated elapsed time also reflects acquired permeation flux decrease factors, for example, the deposition of scale, such as inorganic salts, from concentrated feedwater or the deposition of metabolites produced by growing microorganisms.

Thus, in practice, even if the m value is −0.02 and the calculated elapsed time before decrease is 8 years, it is not always possible to supply water for 8 years because of the contamination factors described above and the physical strength life of the membrane.

Example V-1

When flocculation-treated water prepared using the synthetic product A according to the present invention (melting point 183° C.) in Example IV-2 was used as RO membrane feedwater, the results were excellent: the m value was −0.0282, and the calculated number of elapsed water supply days before the permeation flux decreased by 20% was 113 days.

TABLE 6

Example V-1 (flocculation-treated water according to Example IV-2)

| Permeation time (hr) | Days | Permeation flux ($m^3/m^2 \cdot$ day) | Permeation flux decrease rate (% based on initial value) | m value |
|---|---|---|---|---|
| 1 | Initial value | 0.922 | | |
| 5 | | 0.903 | 2.1 | |
| 24 | 1 | 0.862 | 6.5 | −0.0212 |
| 48 | 2 | 0.845 | 8.4 | −0.0225 |
| 72 | 3 | 0.822 | 10.8 | −0.0268 |
| 96 | 4 | 0.811 | 12.0 | −0.0281 |
| 168 | 7 | 0.798 | 13.4 | −0.0282 |
| 240 | 10 | 0.790 | 14.3 | −0.0282 |
| Calculated elapsed time before permeation flux decrease rate reached 20% (days) | | | | 113 |

Example V-2

When flocculation-treated water prepared using the synthetic product C according to the present invention (melting point 151° C.) in Example IV-5 was used as RO membrane feedwater, the results were excellent: the m value was −0.0294, and the calculated number of elapsed water supply days before the permeation flux decreased by 20% was 83 days.

TABLE 7

Example V-2 (flocculation-treated water according to Example IV-5)

| Permeation time (hr) | Days | Permeation flux ($m^3/m^2 \cdot$ day) | Permeation flux decrease rate (% based on initial value) | m value |
|---|---|---|---|---|
| 1 | Initial value | 0.941 | | |
| 5 | | 0.922 | 2.0 | |
| 24 | 1 | 0.884 | 6.1 | −0.0197 |
| 48 | 2 | 0.863 | 8.3 | −0.0224 |
| 72 | 3 | 0.846 | 10.1 | −0.0263 |
| 96 | 4 | 0.822 | 12.6 | −0.0296 |
| 168 | 7 | 0.809 | 14.0 | −0.0295 |
| 240 | 10 | 0.801 | 14.9 | −0.0294 |
| Calculated elapsed time before permeation flux decrease rate reached 20% (days) | | | | 83 |

Comparative Example V-1

When flocculation-treated water prepared using the comparative synthetic product F (melting point 125° C.) in Comparative Example IV-3, which had a low melting point in spite of the resole-type second-order reaction, was used as RO membrane feedwater, the m value was −0.0351, and the calculated number of elapsed water supply days before the permeation flux decreased by 20% was 24 days. These values are distinctively different from the values in Examples.

TABLE 8

Comparative Example V-1 (flocculation-treated water according to Comparative Example IV-3)

| Permeation time (hr) | Days | Permeation flux ($m^3/m^2 \cdot$ day) | Permeation flux decrease rate (% based on initial value) | m value |
|---|---|---|---|---|
| 1 | Initial value | 0.931 | | |
| 5 | | 0.913 | 1.9 | |
| 24 | 1 | 0.867 | 6.9 | −0.0224 |
| 48 | 2 | 0.844 | 9.3 | −0.0253 |
| 72 | 3 | 0.817 | 12.2 | −0.0305 |
| 96 | 4 | 0.803 | 13.7 | −0.0324 |
| 168 | 7 | 0.779 | 16.3 | −0.0348 |
| 240 | 10 | 0.768 | 17.5 | −0.0351 |
| Calculated elapsed time before permeation flux decrease rate reached 20% (days) | | | | 24 |

Comparative Example V-2

When flocculation-treated water prepared using the comparative preparation product H (melting point 71° C.) in Comparative Example IV-6, which had not been subjected to the resole-type second-order reaction, was used as RO membrane feedwater, the m value was −0.0375, and the calculated number of elapsed water supply days before the permeation flux decreased by 20% was 16 days. These values are better than Comparative Example V-3 with polyferric sulfate alone but are distinctively different from the values in Examples.

TABLE 9

Comparative Example V-2 (flocculation-treated water according to Comparative Example IV-6)

| Permeation time (hr) | Days | Permeation flux ($m^3/m^2 \cdot day$) | Permeation flux decrease rate (% based on initial value) | m value |
|---|---|---|---|---|
| 1 | Initial value | 0.942 | | |
| 5 | | 0.922 | 2.1 | |
| 24 | 1 | 0.868 | 7.9 | −0.0257 |
| 48 | 2 | 0.836 | 11.3 | −0.0308 |
| 72 | 3 | 0.813 | 13.7 | −0.0344 |
| 96 | 4 | 0.798 | 15.3 | −0.0363 |
| 168 | 7 | 0.778 | 17.4 | −0.0373 |
| 240 | 10 | 0.767 | 18.6 | −0.0375 |
| Calculated elapsed time before permeation flux decrease rate reached 20% (days) | | | 16 | |

Comparative Example V-3

When flocculation-treated water prepared using the Comparative Example IV-7, which included polyferric sulfate alone without the addition of an alkaline solution of a phenolic resin, was used as RO membrane feedwater, the m value was −0.0451, and the calculated number of elapsed water supply days before the permeation flux decreased by 20% was 6 days, indicating a high membrane contamination level.

TABLE 10

Comparative Example V-3 (flocculation-treated water according to Comparative Example IV-7)

| Permeation time (hr) | Days | Permeation flux ($m^3/m^2 \cdot day$) | Permeation flux decrease rate (% based on initial value) | m value |
|---|---|---|---|---|
| 1 | Initial value | 0.972 | | |
| 5 | | 0.942 | 3.1 | |
| 24 | 1 | 0.856 | 11.9 | −0.0400 |
| 48 | 2 | 0.822 | 15.4 | −0.0433 |
| 72 | 3 | 0.807 | 17.0 | −0.0435 |
| 96 | 4 | 0.792 | 18.5 | −0.0449 |
| 168 | 7 | 0.772 | 20.6 | −0.0450 |
| 240 | 10 | 0.759 | 21.9 | −0.0451 |
| Calculated elapsed time before permeation flux decrease rate reached 20% (days) | | | 6 | |

{Flocculation Treatment and RO Membrane Separation Treatment of Industrial Water}
[Flocculation Treatment]

Examples VI-1 and VI-2, Comparative Examples VI-1 to VI-5

Industrial water of the Kashima district in Ibaraki Prefecture was subjected to flocculation treatment with the synthetic product A according to the present invention (melting point 183° C.), or its raw material, that is, the comparative preparation product H (melting point 71° C.), and PAC, or PAC alone. The membrane permeability indicator MFF, the TOC of treated water, and the ultraviolet absorbance were evaluated. Table 11 shows the results.

The source of the industrial water is a closed water area Kitaura, which belongs to a high-level pollution group.

The evaluation methods of the flocculation test, MFF, and ultraviolet absorbance are the same as in the flocculation treatment of biologically-treated water described above except that 100 mg/L of PAC was used as an inorganic flocculant in place of 400 mg/L of polyferric sulfate.

TABLE 11

| | Type | Amount of alkaline solution added (mg/L) | Amount of phenolic resin added (mg/L) | Amount of PAC added (mg/L) | MFF of treated water | UV280 absorbance | Residual phenolic resin concentration (mg/L) | TOC of treated water (mg/L) |
|---|---|---|---|---|---|---|---|---|
| Example VI-1 | Synthetic product A according to the present invention | 2.6 | 0.50 | 100 | 1.072 | 0.103 | 0.01 | 1.69 |
| Example VI-2 | Synthetic product A according to the present invention | 5 | 0.97 | 100 | 1.042 | 0.104 | 0.02 | 1.68 |
| Comparative Example VI-1 | Comparative preparation product H | 2.6 | 0.50 | 100 | 1.108 | 0.114 | 0.12 | 1.78 |
| Comparative Example VI-2 | Comparative preparation product H | 5 | 0.97 | 100 | 1.071 | 0.125 | 0.23 | 1.86 |
| Comparative Example VI-3 | — | — | — | 100 | 1.141 | 0.102 | — | 1.71 |
| Comparative Example VI-4 | — | — | — | 140 | 1.102 | 0.097 | — | 1.68 |
| Comparative Example VI-5 | — | — | — | 180 | 1.103 | 0.094 | — | 1.66 |

Table 11 shows the following.

In Comparative Example VI-3 with 100 mg/L of PAC alone, the MFF was 1.141, which was unsatisfactory as RO feedwater. In Examples VI-1 and VI-2 in which the synthetic product A according to the present invention was also used had MFF of less than 1.10. With an increase in the amount of synthetic product A from 0.50 to 0.97 mg/L, the MFF is improved from 1.072 to 1.042.

With the combined use of the raw material of the synthetic product A according to the present invention, that is, the comparative preparation product H, at an addition level of 0.50 mg/L, the MFF was 1.108, which is inappropriate as feedwater for RO membrane. In Comparative Example V-2 with an addition level of 0.97 mg/L, the MFF is 1.071. However, the ultraviolet absorbance at 280 nm increased to 0.125 relative to 0.102 of Comparative Example VI-3, which employed PAC alone in the treatment, and TOC also increased. The residual low-molecular-weight components including a dinuclear phenol in the novolak phenolic resin was estimated to be 0.23 mg/L.

With PAC alone, in spite of an increase in addition level, MFF of 1.102 at 140 mg/L was the limit.

[RO Membrane Separation Treatment]

Example VII-1, Comparative Examples VII-1 and VII-2

The flocculation-treated water of each of Example VI-1 and Comparative Examples VI-2 and VI-4 was used to perform a flat membrane test using an RO membrane in the same manner as in the RO membrane separation treatment of the flocculation-treated water of the biologically-treated water. Tables 12 to 14 show the results.

TABLE 12

Example VII-1 (Example VI-1 treated water: MFF 1.072)

| Permeation time (hr) | Days | Permeation flux ($m^3/m^2 \cdot day$) | Permeation flux decrease rate (% based on initial value) | m value |
|---|---|---|---|---|
| 1 | Initial value | 0.954 | | |
| 5 | | 0.938 | 1.7 | |
| 24 | 1 | 0.906 | 5.0 | |
| 48 | 2 | 0.892 | 6.5 | |
| 72 | 3 | 0.883 | 7.4 | |
| 96 | 4 | 0.873 | 8.5 | |
| 168 | 7 | 0.862 | 9.6 | |
| 240 | 10 | 0.855 | 10.4 | −0.0200 |
| Calculated elapsed time before permeation flux decrease rate reached 20% (days) | | | 2920 | |

TABLE 13

Comparative Example VII-1
(Comparative Example VI-2 treated water: MFF 1.071)

| Permeation time (hr) | Days | Permeation flux ($m^3/m^2 \cdot day$) | Permeation flux decrease rate (% based on initial value) | m value |
|---|---|---|---|---|
| 1 | Initial value | 0.945 | | |
| 5 | | 0.921 | 2.5 | |
| 24 | 1 | 0.868 | 8.1 | |
| 48 | 2 | 0.850 | 10.1 | |
| 72 | 3 | 0.838 | 11.3 | |
| 96 | 4 | 0.825 | 12.7 | |
| 168 | 7 | 0.815 | 13.8 | |
| 240 | 10 | 0.807 | 14.6 | −0.0288 |
| Calculated elapsed time before permeation flux decrease rate reached 20% (days) | | | 96 | |

TABLE 14

Comparative Example VII-2
(Comparative Example VI-4 treated water: MFF 1.102)

| Permeation time (hr) | Days | Permeation flux ($m^3/m^2 \cdot day$) | Permeation flux decrease rate (% based on initial value) | m value |
|---|---|---|---|---|
| 1 | Initial value | 0.958 | | |
| 5 | | 0.937 | 2.2 | |
| 24 | 1 | 0.893 | 6.8 | |
| 48 | 2 | 0.867 | 9.5 | |
| 72 | 3 | 0.851 | 11.2 | |
| 96 | 4 | 0.841 | 12.2 | |
| 168 | 7 | 0.827 | 13.7 | |
| 240 | 10 | 0.819 | 14.5 | −0.0273 |
| Calculated elapsed time before permeation flux decrease rate reached 20% (days) | | | 102 | |

Tables 12 to 14 show the following.

In Example VII-1, which included the flat membrane test of the flocculation-treated water of Example VI-1 treated with a combination of 0.50 mg/L of the synthetic product A according to the present invention and 100 mg/L of PAC, the permeation flux decrease rate in continuous water supply for 10 days was 10.4%, and the m value was −0.0200. The calculated number of elapsed days before the permeation flux decrease rate reached 20% based on the m value was 2920 days.

In Comparative Example VII-1, which included the flat membrane test of the flocculation-treated water of Comparative Example VI-2 treated with a combination of 0.97 mg/L of the comparative preparation product H and 100 mg/L of PAC, the permeation flux decrease rate in continuous water supply for 10 days was 14.6%, and the m value was −0.0288. The calculated number of elapsed days before the permeation flux decrease rate reached 20% based on the m value was 96 days.

The flocculation-treated water of Comparative Example VI-2 had an excellent membrane permeability indicator of 1.071 but substantially the same flat membrane evaluation results as the flocculation-treated water of Comparative Example VI-3, which was treated with 140 mg/L of PAC alone and had a membrane permeability indicator of 1.102. This is because low-molecular-weight components including a dinuclear phenol remained in the treated water.

In Comparative Example VII-2, which included the flat membrane test of the flocculation-treated water of Comparative Example VI-4 involving flocculation treatment with 140 mg/L of PAC alone, the permeation flux decrease rate in continuous water supply for 10 days was 14.5%, and the m value was −0.0273. The calculated number of elapsed days before the permeation flux decrease rate reached 20% based on the m value was 102 days.

Although the present invention has been described in detail with reference to particular embodiments, it is apparent to a person skilled in the art that various modifications can be made without departing from the spirit and scope of the present invention.

The present application is based on Japanese Patent Application (Japanese Patent Application No. 2009-186348) filed on Aug. 11, 2009 and Japanese Patent Application (Japanese Patent Application No. 2010-081078) filed on Mar. 31, 2010, which are incorporated herein by reference in their entirety.

The invention claimed is:
1. A water treatment method, comprising:
a flocculation treatment process of adding a flocculant to water to be treated; and a membrane separation treatment process of treating flocculation-treated water of the flocculation treatment process by membrane separation, wherein the flocculant contains an alkaline aqueous solution of a phenolic resin produced by a resole-type second-order reaction in a presence of an alkaline catalyst in which an aldehyde is added to an alkaline aqueous solution of a novolak phenolic resin, the novolak phenolic resin being produced by a reaction between a phenol and an aldehyde in a presence of an acid catalyst, the phenolic resin produced by the resole-type second-order reaction has a melting point in a range of 130° C. to 220° C. and a molecular average weight of 5000 to 50000, and contains 15% by weight or less of a low-molecular-weight component having a molecular weight of 1000 or less, and the novolak phenolic resin produced by the reaction between the phenol and the aldehyde in the presence of the acid catalyst contains 3% by weight or more of a dinuclear phenol containing phenol rings connected to each other directly or through a bridge and has a weight-average molecular weight of 2000 or more, and the phenolic resin produced by the resole-type second-order reaction contains less than 3% by weight of a dinuclear phenol containing phenol rings connected to each other directly or through a bridge.

2. The water treatment method according to claim 1, wherein the phenolic resin produced by the resole-type second-order reaction contains 10% by weight or less of the low-molecular-weight component having the molecular weight of 624 or less.

3. The water treatment method according to claim 1, wherein the phenolic resin produced by the resole-type second-order reaction contains 10% by weight or less of the low-molecular-weight component having the molecular weight of more than 624 and less than 1000.

4. The water treatment method according to claim 1, wherein the phenolic resin produced by the resole-type second-order reaction has a melting point in the range of 150° C. to 200° C.

5. The water treatment method according to claim 1, wherein the phenolic resin produced by the resole-type second-order reaction has the molecular average weight of 5000 to 30000.

* * * * *